Dec. 8, 1970     A. R. GHAFOORI     3,545,979

SNACK CHIP AND METHOD OF MAKING

Filed March 18, 1968

INVENTOR.
ABDUL R. GHAFOORI

BY
Hinderstein & Silber

ATTORNEYS

United States Patent Office 3,545,979
Patented Dec. 8, 1970

3,545,979
SNACK CHIP AND METHOD OF MAKING
Abdul R. Ghafoori, 1220 Burt Place,
Fullerton, Calif. 92634
Filed Mar. 18, 1968, Ser. No. 713,764
Int. Cl. A21d 8/02
U.S. Cl. 99—83
12 Claims

ABSTRACT OF THE DISCLOSURE

A process for preparing a snack chip from potatoes and corn. The process comprises simultaneously grinding peeled, diced raw potatoes and whole corn kernels in a stone grinding mill. The resultant dough is sheeted out, sliced into chips, dried, deep fat fried, dusted with seasoning, and bagged for distribution. The snack chip thus prepared from natural nondehydrated ingredients is a nourishing food product of distinctive flavor.

BACKGROUND OF THE INVENTION

Field of the invention

The present invention relates to a snack food product and a new and improved method for making the same. More particularly, the invention relates to a process for producing a snack chip from natural potatoes and corn.

Description of the prior art

One need only recall what food was served at last night's party, or what product the youngster requested mother to buy at the grocery to realize the tremendous economic importance of snack products in the food industry. An ever increasing variety of potato chips, corn chips, puffs and crisps of corn or other cereal, snacks plain and snacks flavored with cheese, meat or nuts compete side by side on the grocery shelves for the buyer's dollar.

In this competitive market, consumer approval and hence commercial success or failure, ultimately rests on how delectable or satisfying is a product's taste. Is the snack "delicious," natural in taste, satisfactory in texture? Or is it too unfamiliar, "a little too salty," a bit too strong? The difference between "delectable" and "detestable" may mean a market for 100,000 cases of chips or only 1,000.

To satisfy the discriminating taste of the consumer, and yet to permit utilization of high quality, high-volume production techniques, two general approaches have been taken. First, a line of snack products employing natural ingredients has been used to produce potato chips, corn chips, tortilla chips and the like. These snacks, which impress the consumer with the naturalness of their flavor, are produced primarily from a single raw natural ingredient. The recipes and cooking processes used are designed to maintain the natural flavor of the principal ingredient. The second line of snack products is produced from dry materials such as starch or flour components of cereals, dehydrated potatoes, vital gluten and the like. Unique flavors are obtained by appropriate selection of the various dry ingredients.

Typical of the prior art natural snack products are potato chips, made by finely slicing and deep fat frying whole potatoes. Similarly, corn chips are prepared by steeping whole corn kernels. The kernels are ground to form a corn masa dough which is sheeted out, sliced, dried and deep fat fried to produce a delectable corn or tortilla chip. Alternatively, corn chips may be produced by pressure cooking whole corn kernels in an alkaline solution or cooking corn grits blended with sodium bicarbonate in a sucrose and water solution. The resultant dough is sheeted, cut, dried and deep fat fried to produce the corn chips. In each case, such prior art snack products primarily comprise a single natural ingredient, i.e., sliced potatoes or whole corn kernels, the snack often retaining something of the natural flavor of its principal ingredient.

By distinction, prior art snack products produced from dry materials often include a conglomerate of different ingredients. Typical of this approach is the "Method of Producing a Chip-Type Food Product" described in U.S. Patent No. 3,027,258. In this process, a dough is made of water, dry vital gluten (20% to 35%), gelatinized amylopectin (44% to 63%) and inert edible materials. The dough is formed into flakes, dried at a temperature at which the gluten will not be devitalized, and deep fat fried to form a chip-type product. The amylopectin may comprise waxy maize starch or dried potatoes, while the inert material may comprise amylose starch fractions of wheat, corn, potato or tapioca starch. Thus a particular recipe may include forming by mixing precooked instant dried potatoes, dry gelatinized waxy maize and dried vital gluten.

Other prior art snack processes using dry ingredients include preparation of a dough from dried flour and water, followed by gelatinization, drying and immersion of the dough into hot oil where it explodes and expands to form a frothed, cellular, or spongelike product. Alternatively, a dough may be prepared from starch or flour, and a chunky food product such as bits of nuts, cheese, meat incorporated to add a distinctive taste and texture to the resultant chip.

While prior art processes for making snack products from dry ingredients permit the use of a variety of starting materials, selected to impart a unique flavor to the product, the resultant chips often lack the desirable taste of snacks prepared from natural ingredients. The present invention sets forth a process for making a delectable snack chip which uniquely combines the flavors of several natural ingredients. The resultant snack has a desirable taste, a light yet crisp texture and sufficient strength to permit its being dipped into cheeses or the like. The snack may be made from natural potatoes and corn utilizing a simple process amenable to high volume, high quality production.

SUMMARY OF THE INVENTION

A delectable snack chip may be produced utilizing raw whole potatoes and whole corn kernels as the starting ingredients, preferably with a slight predominance of potatoes. The raw potatoes are peeled, diced or sectioned, and washed prior to being combined with the corn. The whole corn kernels typically are prepared by steeping in a mild alkaline solution for several hours.

In accordance with the present invention, the sectioned raw potato and prepared whole corn kernels simultaneously are ground in a stone grinding mill to produce dough having a water content on the order of 50%. The dough is sheeted out, as by rolling between spaced parallel rollers, and cut into chip-size pieces. The cut dough is dried to approximately 20% moisture content, deep fried in oil, dusted with salt or other seasoning, and packed in appropriate plastic bags or containers for sale.

Alternatively, small amounts of natural whole kernels of wheat, rice, or other cereal may be added to the raw potatoes and corn prior to stone mill grinding to add variety to the taste of the resultant snack chip.

OBJECTS

Thus it is an object of the present invention to provide a process for making an improved snack chip.

It is another object of the present invention to provide a process for making a snack chip from a mixture of natural raw ingredients.

Another object of the present invention is to provide a process for making a snack chip from raw potatoes and corn.

Yet another object of the present invention is to provide a process for making a potato-corn snack starting from natural, non-dehydrated ingredients.

A further object of the present invention is to provide a process wherein raw potatoes are peeled, diced and ground together with whole kernel corn in a stone mill to form a dough for producing a snack chip.

It is a further object of the present invention to provide a process for making a snack chip comprising preparing raw potatoes and whole corn kernels, simultaneously grinding these ingredients in a stone mill to form a dough, then sheeting, slicing, drying, and deep fat frying the dough to produce a delectable snack.

Still a further object of the present invention is to provide a unique snack type food product produced in accordance with the hereindescribed process.

Still other objects, features, and attendant advantages of the present invention will become apparent to those skilled in the art from a reading of the following detailed description of the preferred embodiment in accordance therewith, taken in conjunction with the accompanying drawings wherein:

DESCRIPTION OF THE PREFERRED EMBODIMENT

Figure 1:
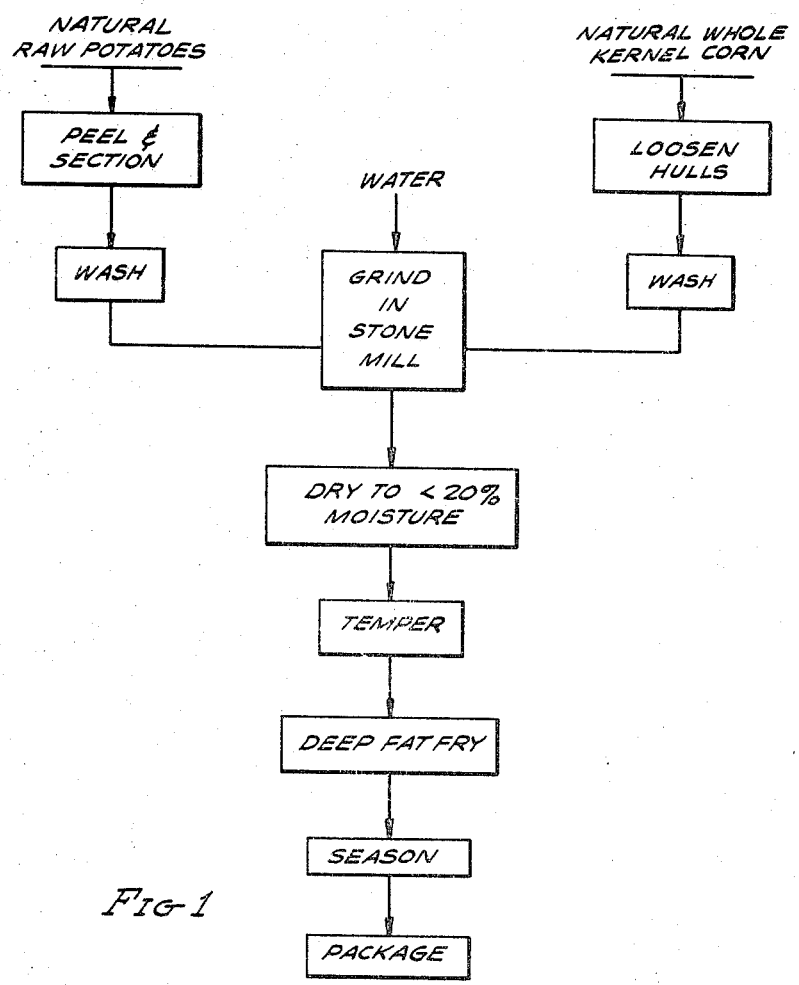
FIG. 1 is a flow diagram of a process, embodying various features of the invention, for producing a snack chip.

A new and delectable snack chip may be prepared from natural raw potatoes and corn using the inventive process, a preferred embodiment of which is shown diagrammatically in FIG. 1. The process permits production of snack chips having a distinctive natural flavor and a texture, reminiscent of tortilla chips, which is both satisfying to the palate yet of sufficient strength to permit the chip to be dipped into a cheese spread without breaking.

To prepare snack chips in accordance with the present invention (see FIG. 1), raw potatoes initially are peeled, and diced or sectioned into small pieces typically on the order of ¼ to ½ inch square. The sectioned potatoes then are washed, a step which may be accomplished in a slightly tilted rotating tumbler of a type well known in the food processing art. Subsequent to washing the potatoes are fed together with appropriately prepared whole corn kernels via a hopper into a stone grinding mill.

Preparation of the natural whole kernel corn used in the inventive process is somewhat a matter of choice, the objective being primarily to loosen the outer hulls of the kernels sufficiently to permit the corn to be finely and substantially uniformly ground in a stone mill. This preparation of the corn may comprise cooking the kernels in a small amount of alkali such as calcium bicarbonate, then steeping the corn for a period of several hours. The corn then is washed in a perforated-wall tumbler, most of the loosened hulls being washed away through the holes in the tumbler wall. The washed kernels then are fed, together with the raw sectioned potatoes, into a stone grinding mill. Sufficient water may be added directly to the corn-potato mixture being ground so that the resultant dough has a moisture content of between about 30% and about 60% by weight.

Preferably, an overall excess by weight of potatoes over corn is desirable, a particularly flavorful snack chip being obtained when a mixture of about 60% by weight of raw potatoes and 40% of corn is fed to the stone grinding mill.

Stone mill grinding proceeds sufficiently long so as to obtain a dough having a relatively uniform average particle size. As noted, the water content of the dough preferably is between 30% and 60%, resulting in a dough which is quite pliable and which may be sheeted out using conventional techniques. It has been found particularly practical to sheet the dough by passing it between two spaced stainless steel rollers, one of which contains cutter edges for slicing the dough into chip-sized segments as it is being sheeted out. While the thickness of the sheeted dough is not critical, a most satisfactory product is obtained using a between-roller spacing of less than about 60 thousandths of an inch.

The sheeted dough segments next are dehydrated, preferably to a moisture content of less than 20%. This may be accomplished by passing the chips for a short period of time (typically 5 to 15 seconds) under an oven heated to about 300° F. to 400° F. The dried chips then may be tempered by passing them over a segmented conveyor belt, prior to deep fat frying.

As a next step, the dried dough segments are fried in vegetable oil heated to a temperature on the order of 360° F. to 375° F. A frying period of from about 5 to about 15 seconds has been found most satisfactory. Finally, the snack chips are removed from the fat and dusted with salt or other flavoring prior to being packaged. The resultant snack chip has been found to have an oil content on the order of 25% to 30%, somewhat lower than that of potato chips, but sufficient to impart a nourishing taste to the snack.

Figure 2:
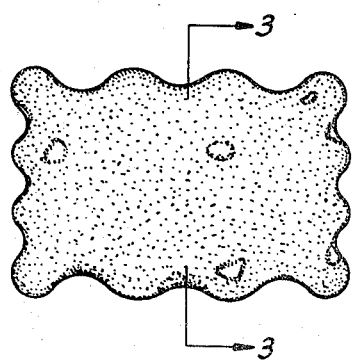
FIG. 2 is a front elevation view of a typical snack chip produced in accordance with the present invention.
Figure 3:
FIG. 3 is a section view of the snack chip shown in FIG. 2, as seen generally along the line 3—3 thereof.

Snack chips prepared in accordance with the herein described inventive process typically may have the appearance shown in FIGS. 2 and 3. Of course, the actual size and shape of the snack is a matter of choice. The slightly rough texture shown in the drawings is characteristic of the snack chips. The slight curling of the snack evident in FIG. 3 occurs during the deep fat frying, and adds interest to the appearance of the product.

It will be understood by one skilled in the food production art that variations may be made to the process described herein. For example, the relative proportions of corn and potatoes may be adjusted to produce snack chips of slightly different taste. Further, other natural ingredients may be added to the unground corn and potato mixture. For example, small amounts of seasonings, or small percentages of whole rice kernels or whole wheat may be added prior to stone mill grinding to modify slightly the taste of the chip, while still retaining a natural flavor.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A process for producing a snack chip from natural raw potatoes and natural whole kernels of corn, said process comprising the steps of:
   sectioning said raw potatoes,
   loosening the hulls of said kernels,
   washing said kernels,
   grinding together said sectioned potatoes and said washed kernels in a stone mill with sufficient water to produce a dough having a moisture content on the order of 30% to 60%,
   forming said dough into chip-shaped pieces,
   drying said pieces to less than about 20% moisture content, and
   deep frying said dried pieces.

2. The process defined in claim 1 wherein sufficient potatoes are ground together with said kernels to provide an excess by weight of potatoes as compared with corn in said dough.

3. The process defined in claim 2 wherein about 60% by weight of said potatoes and 40% by weight of said kernels is introduced into said stone mill.

4. The process as defined in claim 2 wherein said forming step comprises sheeting said dough and cutting said sheeted dough into pieces.

5. The process defined in claim 4 wherein said forming is accomplished by passing said dough through spaced cylindrical rollers, one of said rollers including cutting edges to cut said dough.

6. The process defined in claim 4 further comprising the steps of peeling said potatoes prior to said sectioning, and washing said sectioned potatoes prior to said grinding.

7. The process defined in claim 6 wherein said loosening is accomplished by cooking said kernels in calcium bicarbonate and steeping said cooked kernels for several hours.

8. The process defined in claim 7 wherein said drying is accomplished by passing said pieces under an oven heated to between about 300° F. and 400° F. for a period of between about 5 and 15 seconds.

9. The process defined in claim 8 wherein said deep frying is accomplished by immersing said dried pieces into vegetable oil heated to a temperature on the order of 360° F. to 375° F. for a period of between about 5 and 15 seconds.

10. The process defined in claim 2 further comprising grinding small percentages of whole cereal together with the said potatoes and corn being ground.

11. The process defined in claim 10 wherein said cereal comprises one of rice or wheat.

12. The snack chip product produced by the process of claim 1.

References Cited
UNITED STATES PATENTS

| | | | |
|---|---|---|---|
| 2,785,981 | 3/1951 | Dinesen | 99—100 |
| 2,916,378 | 3/1959 | Kunce et al. | 99—100 |
| 3,230,094 | 5/1963 | Hilton | 99—207 |
| 3,259,503 | 7/1966 | Tan et al. | 99—100 |
| 3,361,573 | 1/1968 | Reinertsen | 99—100 |

NORMAN YUDKOFF, Primary Examiner

M. G. MULLEN, Assistant Examiner

U.S. Cl. X.R.

99—100, 103, 207